(12) United States Patent
Taracko et al.

(10) Patent No.: US 10,583,861 B2
(45) Date of Patent: Mar. 10, 2020

(54) FRAME ASSEMBLY FOR A VEHICLE AND VEHICLE HAVING SAME

(71) Applicant: Honda Motor Co., Ltd., Tokyo (JP)

(72) Inventors: Matthew L. Taracko, Marysville, OH (US); Luke M. Upah, Williamsburg, IA (US)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 15/914,613

(22) Filed: Mar. 7, 2018

(65) Prior Publication Data
US 2019/0276085 A1  Sep. 12, 2019

(51) Int. Cl.
*B62D 23/00* (2006.01)
*B62D 21/15* (2006.01)
*B62D 25/04* (2006.01)
*B62D 21/02* (2006.01)
*B62D 27/02* (2006.01)
*B62D 21/09* (2006.01)

(52) U.S. Cl.
CPC .......... *B62D 23/005* (2013.01); *B62D 21/02* (2013.01); *B62D 21/152* (2013.01); *B62D 25/04* (2013.01); *B60G 2300/07* (2013.01); *B62D 21/09* (2013.01); *B62D 27/023* (2013.01)

(58) Field of Classification Search
CPC ...... B62D 31/02; B62D 47/02; B62D 31/025; B62D 25/06; B62D 31/04; B62D 29/043; B62D 27/026; B62D 33/044
USPC ....... 296/178, 203.01, 191, 29, 203.03, 205, 296/24.4, 63, 65.04, 68.1, 84.1, 25, 296/187.12
See application file for complete search history.

(56) References Cited

U.S. PATENT DOCUMENTS

| 8,066,315 | B2 | 11/2011 | Suzuki et al. |
| 8,303,030 | B2 | 11/2012 | Baccouche et al. |
| 8,419,111 | B2 | 4/2013 | Uchida et al. |
| 9,365,241 | B1 | 6/2016 | Taracko et al. |

(Continued)

FOREIGN PATENT DOCUMENTS

| CN | 101138999 A | 3/2008 |
| EP | 2958792 A2 | 12/2015 |

(Continued)

*Primary Examiner* — D Glenn Dayoan
*Assistant Examiner* — Sunsurraye Westbrook
(74) *Attorney, Agent, or Firm* — Honda Patents & Technologies North America, LLC; Clifford B Vaterlaus

(57) ABSTRACT

A vehicle frame assembly can include a lower frame member extending in a longitudinal direction of the vehicle; a pillar member extending upwardly away from the lower frame member, and a first frame member including a first end connected to the lower frame member and a second end connected to the pillar member. The pillar member can extend upwardly along a vertical direction of the vehicle. The first frame member can include an inward bend located between first end and the second end such that the first frame member can extend upwardly from the lower frame member along the vertical direction of the vehicle from the first end of the first frame member to the inward bend and the first frame member can extend from the inward bend rearwardly along the longitudinal direction of the vehicle and outwardly along a transverse direction of the vehicle toward the pillar member.

20 Claims, 7 Drawing Sheets

(56) References Cited

U.S. PATENT DOCUMENTS

| | | | |
|---|---|---|---|
| 2010/0314191 A1* | 12/2010 | Deckard | B60N 2/01 |
| | | | 180/312 |
| 2012/0161468 A1* | 6/2012 | Tsumiyama | B60J 5/0487 |
| | | | 296/146.11 |
| 2013/0087397 A1* | 4/2013 | Yamamoto | B60G 3/20 |
| | | | 180/68.4 |
| 2013/0199097 A1* | 8/2013 | Spindler | B60J 5/047 |
| | | | 49/394 |
| 2015/0367890 A1 | 12/2015 | Kurokawa | |
| 2016/0288686 A1 | 10/2016 | Reed et al. | |
| 2017/0136874 A1 | 5/2017 | Harris et al. | |

FOREIGN PATENT DOCUMENTS

| | | |
|---|---|---|
| EP | 3003827 B1 | 2/2017 |
| WO | 2014130611 A2 | 8/2014 |

\* cited by examiner

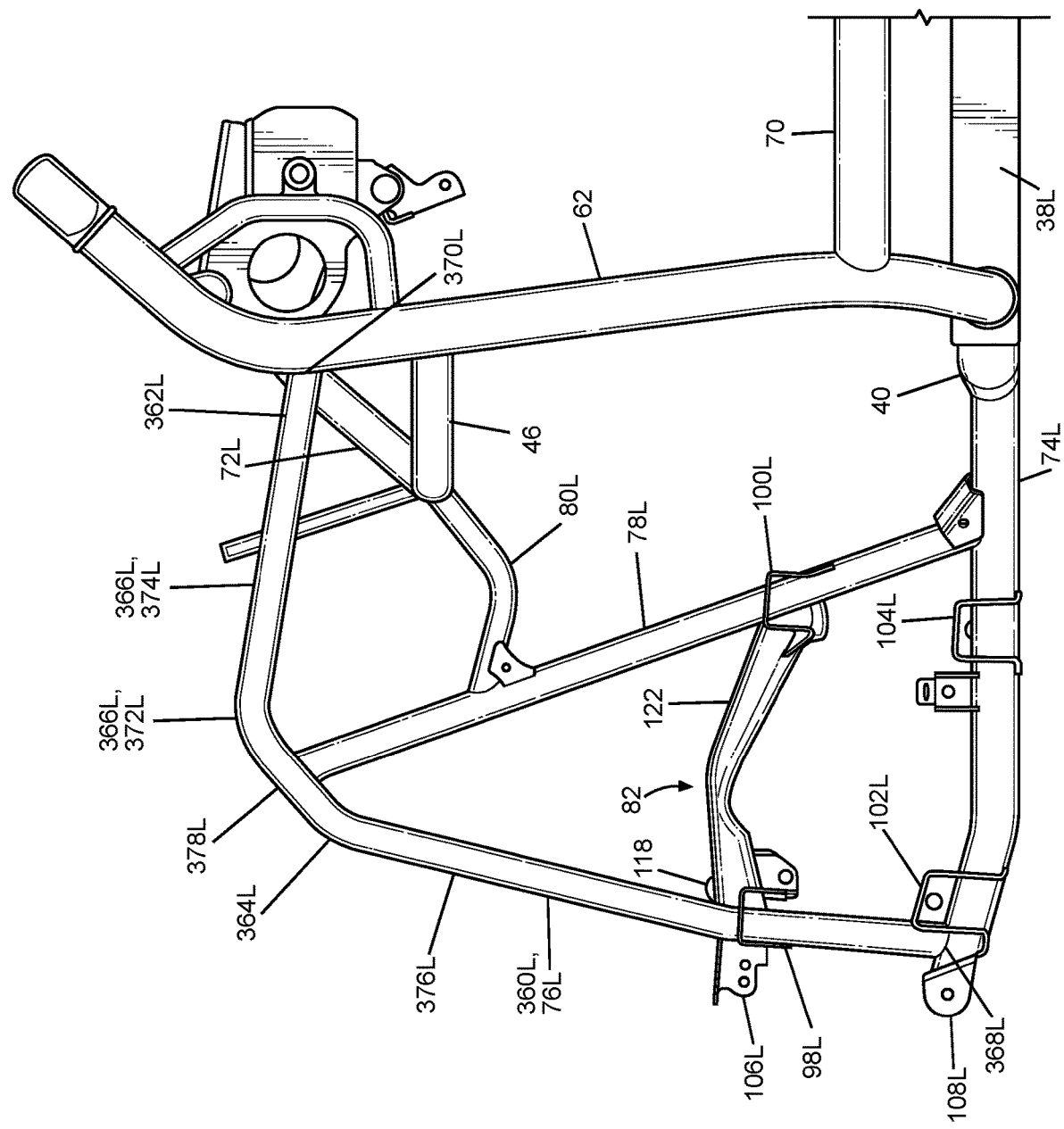

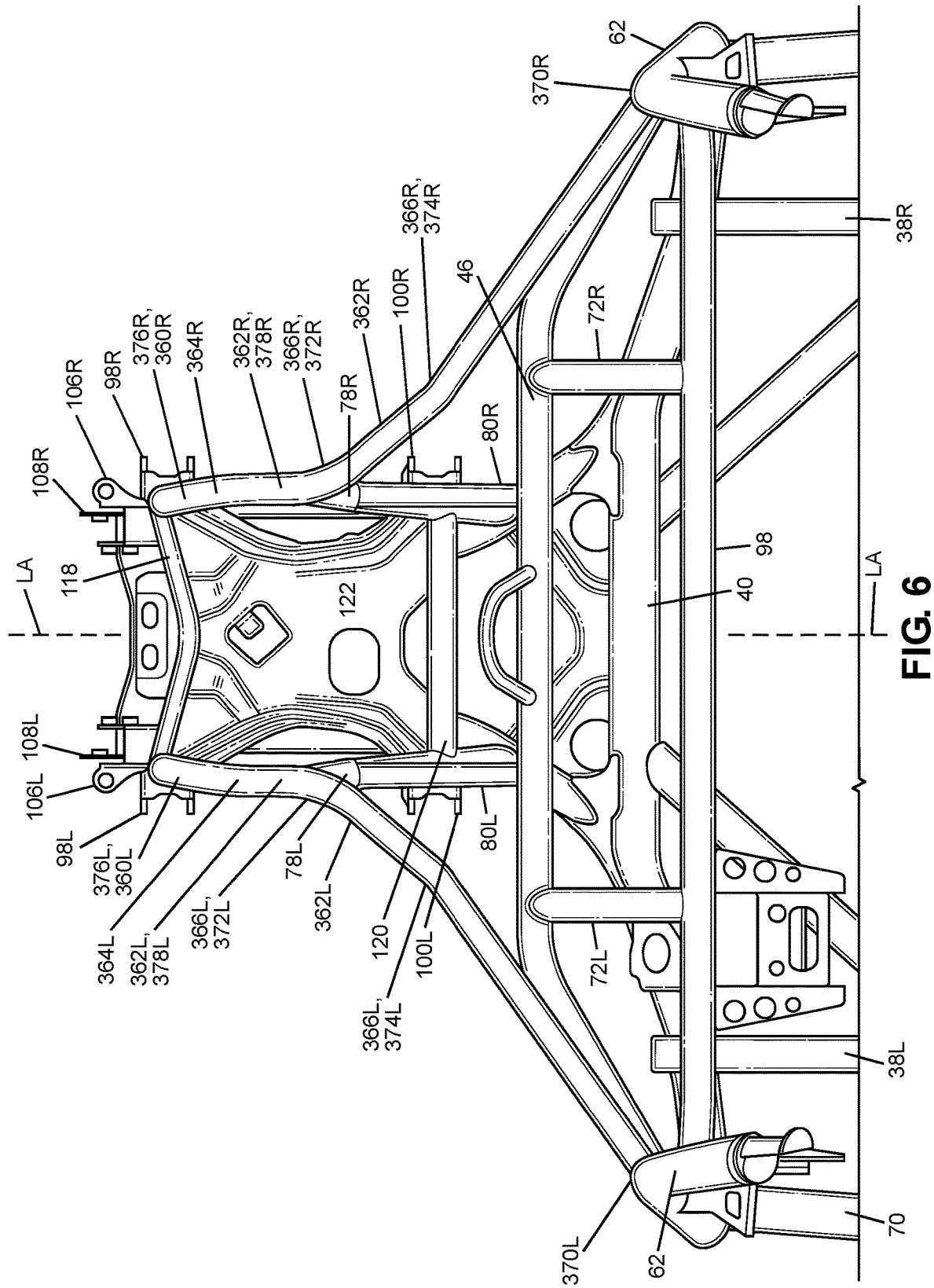

US 10,583,861 B2

FRAME ASSEMBLY FOR A VEHICLE AND VEHICLE HAVING SAME

BACKGROUND

The disclosed subject matter relates to a vehicle and a frame assembly for the vehicle. More particularly, the disclosed subject matter relates to methods and apparatus that enhance load and energy management performance upon application of external loads and stresses, such as may occur during off-road travel over uneven terrain.

Vehicles, such as but not limited to all-terrain vehicles, can be subjected to relatively large load and/or energy inputs to the frame assembly due to the unevenness of the terrain across which the vehicle is travelling. The all-terrain vehicle can include a generally rigid frame assembly that is designed to withstand the load and energy inputs transmitted from the wheels and through the suspension components during travel over the uneven terrain. For example, space constraints and off-road durability may make it beneficial to provide very stiff portions of the vehicle frame that are spaced from the passenger area, such as but not limited to frame structures around the front suspension components, rear suspension components and/or powertrain components.

SUMMARY

Some embodiments are directed to a frame assembly of a vehicle that can include a lower frame member extending in a longitudinal direction of the vehicle. A pillar member can extend upwardly and away from the lower frame member, the pillar member extending upwardly along a vertical direction of the vehicle. A first frame member can include a first end connected to the lower frame member and a second end connected to the pillar member. The first frame member can include an inward bend located between first end and the second end such that the first frame member extends upwardly from the lower frame member along the vertical direction of the vehicle from the first end of the first frame member to the inward bend and the first frame member extends from the inward bend rearwardly along the longitudinal direction of the vehicle and outwardly along a transverse direction of the vehicle toward the pillar member.

Some embodiments are directed to a frame assembly of a vehicle that includes a pair of lower frame members extending in a longitudinal direction of the vehicle, the lower frame members being spaced apart from each other in a transverse direction of the vehicle. A pair of pillar members can be spaced apart from each other in the transverse direction of the vehicle, each of the pillar members extending upwardly away from a respective one of the lower frame members, and the pillar members extending upwardly along a vertical direction of the vehicle. A pair of first frame members can be spaced apart in the transverse direction of the vehicle, each of the first frame members including a first end connected to a respective one of the lower frame members and a second end connected to a respective one of the pillar members, and each of the first frame member including an inward bend located between first end and the second end such that each of the first frame members extends upwardly from the respective one of the lower frame members along the vertical direction of the vehicle from the first end of the first frame member to the inward bend. Each of the first frame members can extend from the inward bend rearwardly along the longitudinal direction of the vehicle and outwardly along a transverse direction of the vehicle toward the respective one of the pillar members.

Some embodiments are directed to an all-terrain vehicle that can include a main frame assembly defining a passenger compartment of a vehicle. The main frame can include a pair of A-pillar members located at respective front corners of the passenger compartment and extending along a vertical direction of the all-terrain vehicle, and a cross member extending between the A-pillars along a transverse direction of the all-terrain vehicle. A front frame assembly can be connected to a front portion of the main frame assembly, and can include a pair of lower frame members extending in a longitudinal direction of the vehicle, the lower frame members being spaced apart from each other in a transverse direction of the vehicle, and a pair of first frame members spaced apart in the transverse direction of the vehicle. Each of the first frame members can include a first end connected to a respective one of the lower frame members and a second end connected to a respective one of the pillar members, and each of the first frame members can include an inward bend located between the first end and the second end such that each of the first frame members extends upwardly from the respective one of the lower frame members along the vertical direction of the vehicle from the first end of each of the first frame members to the inward bend. Each of the first frame members can extend from the inward bend rearwardly along the longitudinal direction of the vehicle and outwardly along a transverse direction of the vehicle toward the respective one of the pillar members.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is side view of the left side of the portion of the frame assembly of FIG. 4.

FIG. 6 is a plan view of the portion of the frame assembly of FIG. 4.

DETAILED DESCRIPTION OF EXEMPLARY EMBODIMENTS

Figure 1:
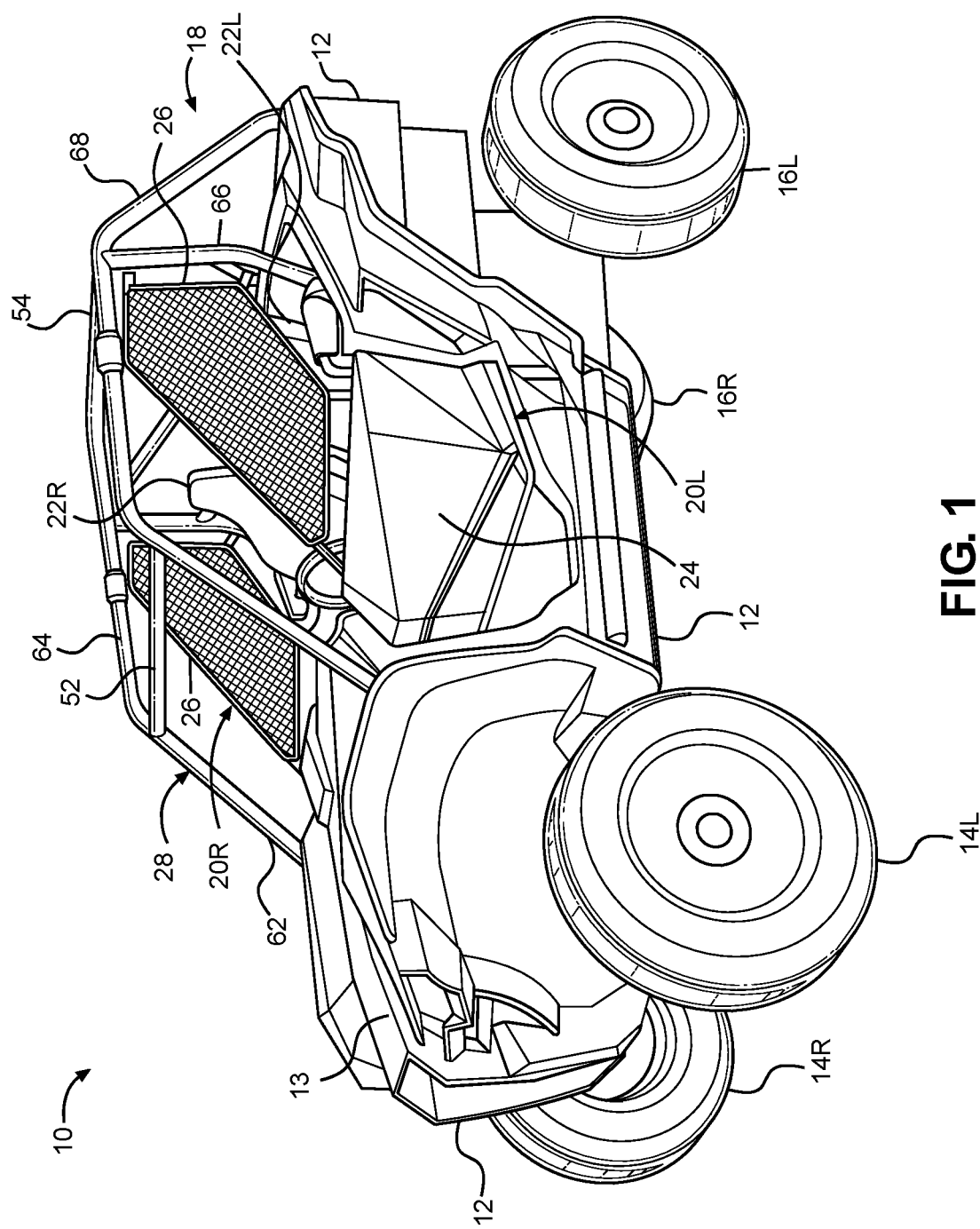
FIG. 1 is a perspective view of a vehicle made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicular design factors may make it challenging to sufficiently impede or prevent deformation of the vehicle frame defining the passenger area upon application of significant force inputs into the frame assembly. The stiff portions of the vehicle frame that are spaced from the passenger area, such as but not limited to frame structures around the front suspension components, rear suspension components and/or powertrain components, can transmit most of or the entire load or kinetic energy input to the portion of the vehicle frame defining the passenger area. Typical vehicle frame design constraints and requirements may also limit the use of structures for managing the input load or kinetic energy. As a result, the portion of the vehicle frame defining the passenger area can be subject to deformation due to the input load or kinetic energy.

It may therefore be beneficial to provide a vehicle and a frame for the vehicle with an apparatus that addresses at least one of the above and/or other challenges of related art vehicles. In particular, it may be beneficial to enhance input load and energy management performance upon application of an external load, such as by controlling deformation of the vehicle frame and/or mitigating energy transmission to the passenger area caused by the input load or kinetic energy. For example, portions of the vehicle frame assembly can be configured to absorb and transfer, in a predetermined controlled manner, the load or kinetic energy that originated from the input load or kinetic energy.

In some of these and/or other embodiments, the vehicle frame can be configured to deform at portions spaced from the passenger area. In addition, the frame can be configured with structures that can resist deformation during routine off-road usage of the vehicle, but that can deform in a predetermined controlled manner in response to an input load or kinetic energy. In some of the disclosed and/or other embodiments, the vehicle frame can be configured to deform in the vicinity of the passenger area in a predetermined controlled manner so that the dimensions of the passenger area after loading can be substantially the same as the dimensions of the passenger area prior to the input load or kinetic energy.

It may therefore be beneficial to provide a vehicle with a frame assembly that addresses at least one of the above and/or other disadvantages or concerns of the related art. In particular, it may be beneficial to utilize a frame assembly that is sufficiently rigid to cope with load and/or energy inputs from the suspension as the vehicle travels over uneven terrain of an unimproved path, and that is sufficiently deformable in a predetermined controlled manner in response to load and/or energy inputs different from those input by the suspension. For example, it may be beneficial to utilize a frame assembly that includes a front frame assembly that is configured to distribute loads and/or energy input by each suspension component throughout the entire frame assembly such that the suspension load and/or energy inputs can be transferred to a main frame assembly to which the front frame assembly can be connected.

FIG. 1 is a perspective view of an exemplary vehicle 10 including frame assembly 18 in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
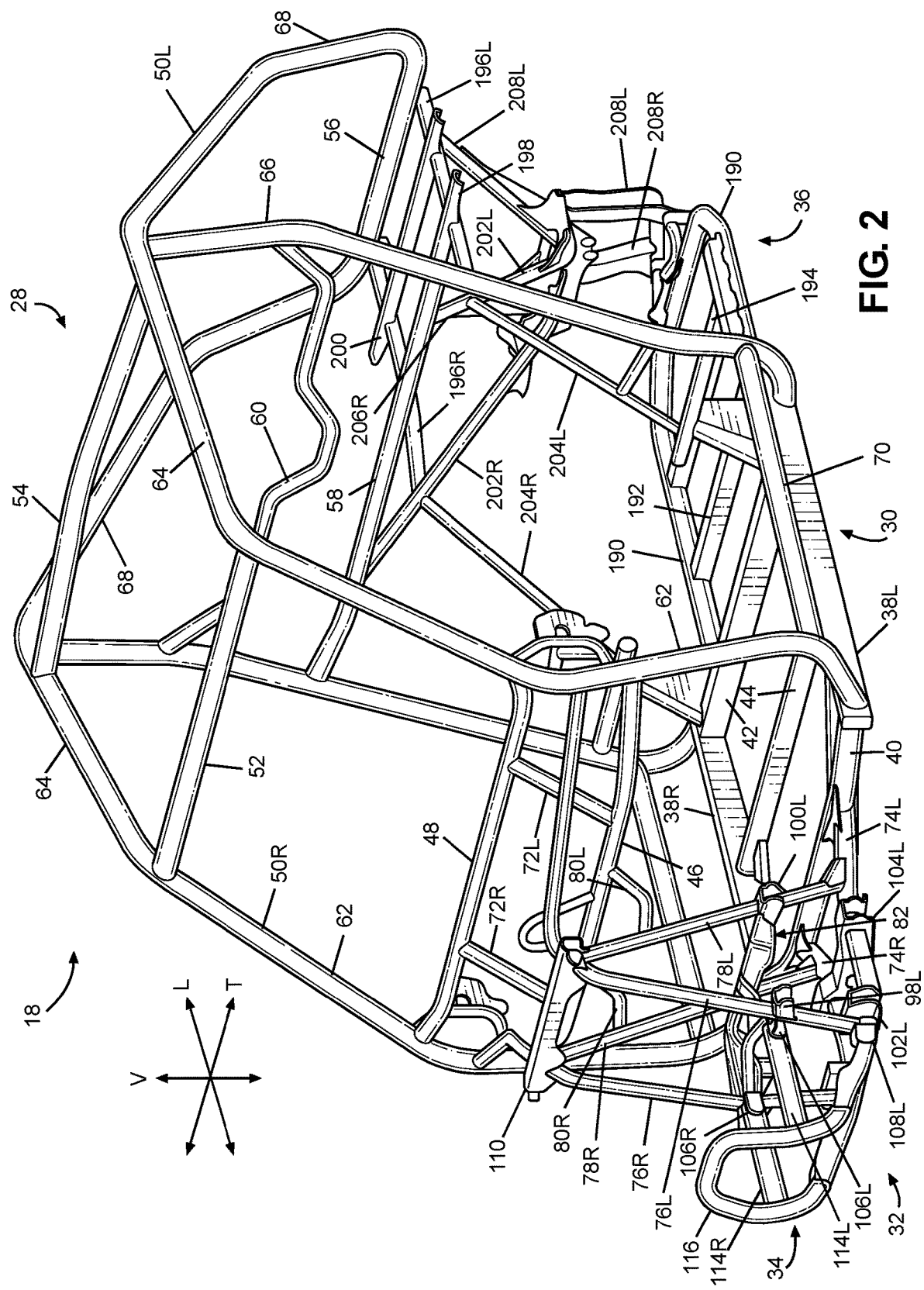
FIG. 2 is perspective view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIG. 2), and the powertrain is omitted from FIG. 1 for simplicity and clarity of the drawing.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, which occupy the door openings, each can include a door 24 and a window panel assembly 26, and can be configured to selectively open and close access through the door openings by moving between a closed position and a fully opened position. (The door 24 of the right-side door assembly 20R is obscured from view in FIG. 1). In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

The powertrain can include an internal combustion engine, one or more electric motor(s) or a hybrid of an internal combustion engine and one or more electric motor(s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

FIG. 2 is a perspective view of the frame assembly 18. The frame assembly 18 can be configured to support the body 12, door assemblies 20L, 20R, seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths. As will be discussed in greater detail below, the frame assembly 18 can be configured to surround the passenger area.

The frame assembly 18 can include a main frame assembly 30, a front frame assembly 32, a front bumper assembly 34 and a rear frame assembly 36. As will be discussed in greater detail below, a load and energy management apparatus can distribute loads input by the front suspension on one side of the front frame assembly 32 to the other side of the front frame assembly 32. Further, the load and energy management system can distribute and attenuate loads and energy throughout the front frame assembly 32 that are applied to the front bumper assembly 34 to thereby manage the energy so that any deflection of the frame assembly 18 in the vicinity of the passenger area can be controlled in an advantageous predetermined manner.

The main frame assembly 30 can define the passenger area of the vehicle 10. The main frame assembly 30 can be configured to provide an overall bending stiffness and torsional stiffness of the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/systems, such as but not limited to portions of the body 12, a front final drive assembly, steering system components, engine cooling system, headlights, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

The main frame assembly 30 can define the passenger area and can include the roll cage 28, a pair of longitudinal members 38L, 38R and a plurality of lower cross members 40, 42, 44, a pair of upper cross members 46, 48 and a pair of support members 72L, 72R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIG. 2, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support member 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIG. 1).

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70. Each of the first through fifth cage side members 62, 64, 66, 68, 70 can be configured as a hollow tube having a substantially circular cross-section shape. The cage side members 62, 64, 66, 68, 70 can be configured with any appropriate elongated shape that can provide the desired dimensionality of the passenger area and advantageously conform to the aesthetic appearance desired for the vehicle 10.

The first cage side member 62 can be referred to as an passenger compartment A-pillar, A-pillar, or a pillar member. The first cage side member 62 can be located at a front corner of the passenger compartment. The first cage side member 62 can be connected at one end to the left longitudinal member 38L adjacent the front end of the left longitudinal member 38L. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L.

Each of the upper cross members 46, 48 can be connected to a middle portion of the first cage side member 62 of each of the cage side assemblies 50L, 50R.

The third cage side member 66 can be referred to as a passenger compartment B-pillar, B-pillar, or a pillar member. The third cage side member 66 can be located at a rear corner of the passenger compartment. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

B. Front Frame Assembly

Referring to FIG. 2, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82. The first front members 76L, 76R can be formed as a frame tube with bends designed to control the location of collapse in an event of predetermined force or kinetic energy input to the frame of the off-road vehicle. The frame tube can connect a lower portion of the vehicle frame to the passenger compartment A-pillar. Bends in the front frame tube can be designed to prevent deformation to the A-pillar (passenger compartment) as it allows the tube to bend in specific locations. The first front frame members 76L, 76R can extend upwardly from the lower portion of the vehicle frame, then rearwardly and outwardly to connect to the vehicle A-pillar, and the first front frame members 76L, 76R can include an inward bend between the upward portion and the A-pillar to form a location for the frame to deform in the event of application of a load or kinetic energy into the frame of the vehicle that exceeds a predetermined threshold, such as load or kinetic energy applied along the longitudinal direction L of the vehicle into the bumper assembly 32.

The front lower frame members 74L, 74R can extend from a respective one of the first front frame members 76L, 76R and toward a respective one of the first side cage members 62 along the longitudinal direction L of the vehicle 10. Each of the front lower frame members 74L, 74R can be mounted on the first lower cross member 40. Each of the front lower frame members 74L, 74R can include a bend in a portion of the lower frame members 74L, 74R that is near the first lower cross member 40.

Each of the second front frame members 78L, 78R can include a first end connected to a respective one of the front lower frame members 74L, 74R and a second end connected to a respective one of the first front frame members 76L, 76R. The second front frame members 78L, 78R can incline away from the first cage side member 62 such that the first end of the second front frame member 78L, 78R are closer to the first cage side member 62 than is the second end of the second front frame members 78L, 78R.

Figure 3:
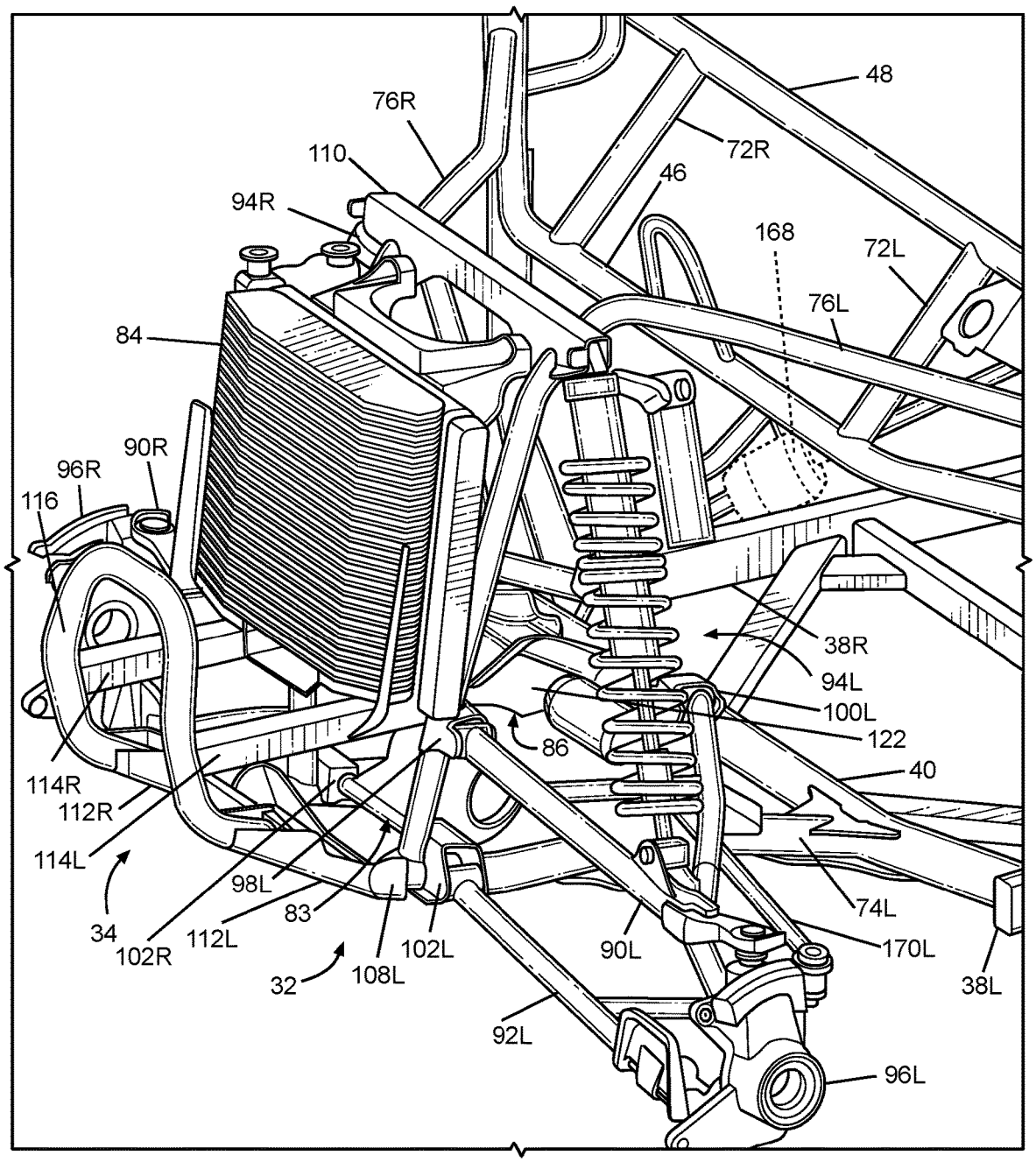
FIG. 3 is a partial perspective view of the frame assembly of FIG. 2 and attached components of the vehicle of FIG. 1.

The front frame members 74L, 74R, 76L, 76R, 78L, 78R can be spaced apart from each other in the transverse direction T of the vehicle 10 by a predetermined distance sufficient to accommodate any component(s) and/or system(s) to be supported by the front frame assembly 32. Referring to FIG. 3, the front frame assembly 32 can be configured to support a front suspension and wheel assembly, a radiator 84, a steering rack assembly 86 and a front final drive assembly 88. The front suspension and wheel assembly can include suspension members 90L, 90R, 92L, 92R, damper and spring assemblies 94L, 94R, front hub assemblies 96L, 96R and the front wheels 14L, 14R.

The front frame assembly 32 can include a plurality of mounting brackets 98L, 98R, 100L, 100R, 102L, 102R, 104L, 104R, 106L, 106R, 108L, 108R that can connect the front suspension and wheel assembly, the radiator 84, and the front bumper assembly 34 to the front frame assembly 32. The front suspension and wheel assembly can be movably connected to each of the suspension brackets 98L, 98R, 100L, 100R, 102L, 102R, 104L, 104R so that the suspension members 90L, 90R, 92L, 92R can pivot relative to the suspension brackets 98L, 98R, 100L, 100R, 102L, 102R, 104L, 104R and the front wheels 14L, 14R can move generally in the vertical direction V of the vehicle 10 as the vehicles travels along an improved or unimproved pathway. The front bumper assembly 34 can be connected to each of the bumper brackets 106L, 106R, 108L, 108R. The following description will be directed toward the brackets 98L, 100L, 102L, 104L, 106L, and 108L mounted on left side of front frame assembly 32 with the understanding that the brackets 98R, 100R, 102R, 104R, 106R, 108R mounted on the right side of the front frame assembly 32 can be a mirror image of the brackets 98L, 100L, 102L, 104L, 106L, 108L left side of the front frame assembly 32, and can be connected to the right side of the front frame assembly 32 in a similar manner.

Referring to FIGS. 2-6, the left side of the front frame assembly 32 can include a pair of upper suspension brackets 98L, 100L, a pair of lower suspension brackets 102L, 104L. Referring to FIG. 3, the upper suspension member 90L can be connected to each of the upper suspension brackets 98L, 100L. The lower suspension member 92L can be mounted to the lower suspension brackets 102L, 104L in any appropriate manner such as but not limited to threaded fasteners, and with or without rubber bushings. The front bumper assembly 34 can be mounted to the upper bumper bracket 106L and the lower bumper bracket 108L in any appropriate manner such as but not limited to threaded fasteners.

The front frame assembly 32 can include an upper bracket 110. The upper bracket 110 can be connected to and extend from each of the first frame members 76L, 76R. The upper bracket 110 can extend in the transverse direction T of the vehicle 10 to span from the left first frame member 76L to the right first frame member 76L. The upper bracket 110 is omitted from FIGS. 5 and 6 for simplicity and clarity of the drawings.

Referring to FIG. 3, an upper end of each of the spring and damper assemblies 94L, 94R can be connected to a respective end of the upper bracket 110 in an appropriate manner such as but not limited to threaded fasteners.

In the exemplary embodiment of FIGS. 2-6, each of the front lower frame members 74L, 74R, the first front frame members 76L, 76R, and the second front frame members 78L, 78R is configured as a hollow metal tube having a substantially circular cross-section. However, any combination of the front lower frame members 74L, 74R, the first front frame members 76L, 76R and the second front frame members 78L, 78R can have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, and the second front frame members 78L, 78R can be welded to each other to form the structure described above. However, the disclosure is intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

The front frame assembly 32 can include a pair of upper bumper brackets 106L, 106R and a pair of lower bumper brackets 108L. (The upper bumper brackets 106L, 106R are shown in phantom in FIGS. 7-9, 12, 13 and 15).

C. Front Bumper Assembly

Figure 4:
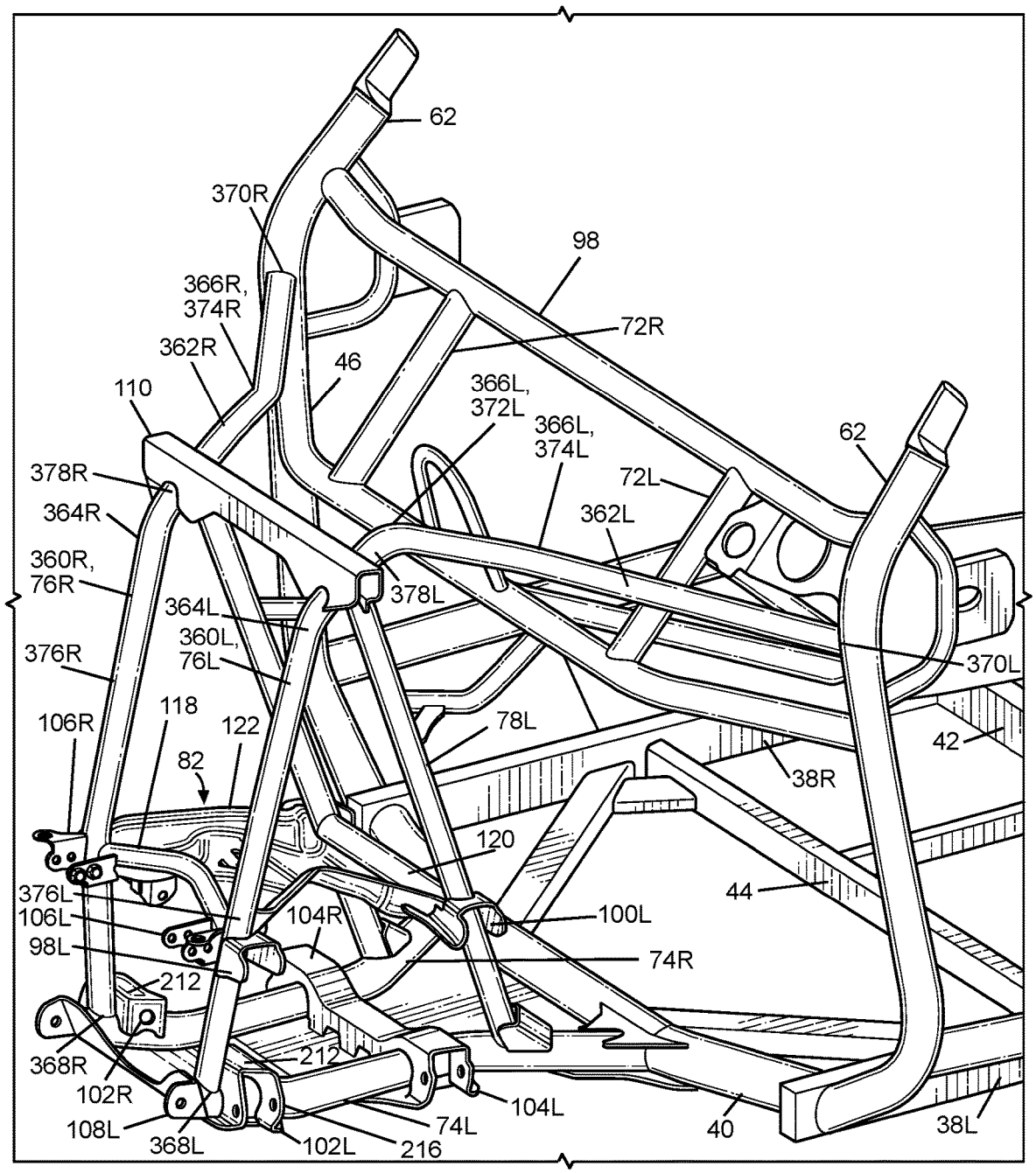
FIG. 4 is a partial perspective view of the frame assembly of FIG. 2.

The front frame assembly 32 can include the front bumper assembly 34. Referring to FIGS. 2-4, the front bumper assembly 34 can be connected to the front side of the first frame members 76L, 76R, such that the first and second frame members 76L, 76R, 78L, 78R are located between or intermediate the front bumper assembly 34 and the main frame assembly 30.

The front bumper assembly 34 can include a pair of lower connector members 112L, 112R, a pair of upper connector members 114L, 114R and a bumper member 116. The bumper member 116 can be a separate structure connected to each of the connector members 112L, 112R, 114L, 114R, or can all be integrated together into a single structure. The bumper member 116 can extend in the transverse direction T of the vehicle 10 to span from the left upper connector member 114L to the right upper connector member 114R.

A first end of each of the lower connector members 112L, 112R can be connected to a respective one of the lower bumper brackets 108L, 108R. Lower connector members 112L, 112R can be connected to the respective one of the bumper brackets such that the lower bumper brackets 108L, 108R can pivot with respect to the lower bumper brackets. The second end of the lower connector members 112L, 112R can be connected to the bumper member 116.

A first end of the upper connector members 114L, 114R can be connected to a respective one of the upper bumper brackets 106L, 106R. The second end of the upper connector members 114L, 114R can be connected to the bumper member 116.

The upper connector members 114L, 114R can be configured to deform in a predetermined and controlled manner in response to load or kinetic energy input to the bumper member 116 that exceeds a first predetermined threshold. For example, the upper connector members 114L, 114R can be configured to collapse along the length of the upper connector members 114L, 114R. That is, the upper connector members 114L, 114R can be formed from any material and/or with any structure that can promote the desired deformation. By way of example only, FIGS. 2-4, show the upper connector members 114L, 114R as elongate members having a rectangular cross-sectional shape. Further, by way of example only, the upper connector members 114L, 114R can include one or more holes, cutouts, corrugated regions, bends, any combination thereof, etc., that can permit the upper connector members 114L, 114R to deform in a predetermined and controlled manner during an impact event.

The lower connector members 112L, 112R can pivot relative the lower bumper brackets 108l, 108R as the upper connector members 114L, 114R collapse. However, exemplary embodiments are intended to include any appropriate connection that can achieve the desired performance of the bumper assembly 34 in response to a load and/or energy that exceeds a predetermined threshold. The first predetermined threshold can be set at a value where only the front bumper assembly 34 is subjected to deformation by the load or kinetic energy input to the bumper member 116, without deformation to the front frame assembly 32 or the main frame member 30.

The bumper member 116 can be configured with any appropriate shape and dimensions that can achieve the desired performance of the front bumper assembly 34 in response to the load or kinetic energy input.

Referring to FIGS. 4-6, the upper bumper brackets 106L, 106R can include a flange to which a bottom of the radiator 84 can be connected in any appropriate manner such as but not limited to threaded fasteners, rivets, and welding. In an exemplary embodiment, each of the upper bumper brackets 106L, 106R can include a hole and the radiator 84 can include a pair of posts. A rubber grommet can be secured in each bracket hole. The radiator posts can be inserted into the grommets and the top end of the radiator 84 can be bolted to an appropriate portion of the front frame assembly 32.

D. Transverse Frame Assembly

The transverse frame assembly 82 can extend in the longitudinal direction L, the transverse direction T and the vertical direction V. Referring to FIGS. 2 and 4-6, the transverse frame assembly 82 can be connected to and extend from each of the first and second frame members 76L, 76R, 78L, 78R. The transverse frame assembly 82 can be configured to cooperate with the front final drive assembly 88 to transfer load or kinetic energy inputs from the front suspension and wheel assembly into each of the front lower frame members 74L, 74R, which in turn, can be configured to transfer the load or kinetic energy input into the first lower cross member 40 of the main frame assembly 30.

Referring to FIGS. 4 and 6, the transverse frame assembly 82 can include a first front cross member 118, a second front cross member 120 and a plate 122.

The first front cross member 118 can be connected to and can extend from each of the first frame members 76L, 76R. The first front cross member 118 can extend in the transverse direction T of the vehicle 10. The first front cross member 118 can be connected to each of first frame members 76L, 76R at a location that generally opposes the location at which the first upper suspension brackets 98L, 98R are connected to the first frame members 76L, 76R. For example, the first front cross member 118 can be connected to an area of the first frame members 76L, 76R that opposes at least a portion of an area on the first frame members 76L, 76R to which the first upper suspension brackets 98L, 98R are mounted. The first front cross member 118 can be curved or bent at a central portion such that the first front cross member 118 is arched upwardly in the vertical direction V of the vehicle 10, and the arch extends away from the front lower frame members 74L, 74R.

The second front cross member 120 can be connected to and can extend from each of the second frame members 78L, 78R. The second front cross member 120 can extend in the transverse direction T of the vehicle 10. The second front cross member 120 can be connected to each of second frame members 78L, 78R at a location that generally opposes the location at which the second upper suspension brackets 100L, 100R are connected to the second frame members 78L, 78R. More specifically, the second front cross member 120 can be connected an area of the of the second frame members 78L, 76R that at least opposes the area on the second frame members 78L, 76R to which the second upper suspension brackets 100L, 100R are mounted. The second front cross member 120 can be a substantially straight member that extends in the transverse direction T of the vehicle 10.

In the exemplary embodiment of FIGS. 2-6, each of the front cross members 118, 120 is configured as a hollow metal tube having a substantially circular cross-section that can be welded to each of the first frame members 76L, 76R and the plate 122. However, exemplary embodiments are intended to include or otherwise cover either one or both of the front cross members 118, 120 being formed of various shapes and cross-sections, and of a material other than metal, such as but not limited to carbon fiber, plastic, carbon fiber reinforced plastic, ceramic, pulp, glass fiber reinforced plastic, or other known structural material. Further, exemplary embodiments are intended to include or otherwise cover any one or both of the front cross members 118, 120 connected to the respective ones of the first and second frame members 76L, 76R, 78L, 78R in other ways such as but not limited to threaded fasteners, adhesives, welds, a combination of brackets and threaded fasteners, or rivets.

Referring to FIGS. 4-6, the plate 122 can be stamped from a flat metal sheet. The plate 122 can extend in the traverse direction T of the vehicle 10 and be connected to each of the front cross members 118, 120. The plate 122 can be connected directly, or indirectly via the front cross members 118, 120, to each of the first and second front frame members 76L 76R, 78L, 78R. The plate 122 can extend in the transverse direction T and the longitudinal direction of the vehicle 10 from each of the first and second frame members 76L, 76R, 78L, 78R.

The plate 122 can be configured to buckle in the longitudinal direction L of the vehicle 10 if a load or kinetic energy is applied to the plate 122 in the longitudinal direction L of the vehicle 10 that exceeds a second predetermined threshold. The second predetermined threshold can be the same as or different from the first predetermined threshold of the front bumper assembly 34. For example, the plate 122 can be connected to each of the first front frame members 76L, 76R at a location that is adjacent to the upper bumper brackets 106L, 106R such that the first front frame members 76L, 76R are located between the front bumper assembly 34 and the plate 122. Thus, the front bumper assembly 34 and the plate 122 can be connected to the first front frame members 76L, 76R at a common node such that a substantial portion of a load or kinetic energy input to the upper bumper brackets 106L, 106R can be transferred through the common node of each of the first front frame members 76L, 76R and into the plate 122. Further, the location and shape of the plate 122 relative to each of the first and second frame members 76L, 76R, 78L, 78R can be selected so that when one or both of the first frame members 74L, 76R is/are deformed by a force or an energy input by the front bumper assembly 34, the plate 122 deforms along the ridge 126.

Further, the plate 122 can be configured to resist deformation when subjected to the load or kinetic energy input via the front bumper assembly 34 until the front bumper assembly 34 initially collapses in a direction toward the main frame assembly 30, and the plate 122 collapses in the direction toward the main frame assembly 30 if the load or the energy input continues to be applied to the first front frame members 76L, 76R via the front bumper assembly 34 after the front bumper assembly 34 initially collapses. For example, the plate 122 can be provided with a geometry, and or a thickness, that provides a bending and/or crush strength that is less than the bending strength of the second front frame members 78L, 78R.

The front final drive assembly 88 can be connected to transverse frame assembly 82 by any appropriate structure such as but not limited to mechanical fasteners, welding, adhesives, etc., such that a load input by the front suspension and wheel assembly can be transmitted to the each of the first frame members 76L, 76R and the front lower frame members 74L, 74R via the front final drive assembly 88 when the front suspension and wheel assembly and the final drive assembly are mounted on the front frame assembly 32.

In the exemplary embodiment of FIGS. 2-6, the plate 122 is configured as three-dimensional, homogenously integrated, stamped metal component that can be welded to each of frame members 76L, 76R, 78L, 78R, 118, 120. However, exemplary embodiments are intended to include or otherwise cover a plate 122 formed of a material other than metal, such as but not limited to carbon fiber, plastic, carbon fiber reinforced plastic, ceramic, pulp, glass fiber reinforced plastic, or other known structural material. Further, exemplary embodiments are intended to include or otherwise cover a plate 122 connected to respective ones of the frame members 76L, 76R, 78L, 78R, 118, 120 in other ways such as but not limited to threaded fasteners, adhesives, a combination of brackets and threaded fasteners, welds, rivets, or other structures/materials. Further still, exemplary embodiments are intended to include or otherwise cover a plate 122 assembled from a plurality of separate pieces.

E. Rear Frame Assembly

Referring to FIG. 2, the rear frame assembly 36 can include a plurality of rear frame members 190, 192, 194, 196L, 196R, 198, 200, 202L, 202R, 204L, 204R, 206L, 206R, 208L, 208R. The rear frame members 190, 192, 194, 196L, 196R, 198, 200, 202L, 202R, 204L, 204R, 206L, 206R, 208L, 208R can be configured to define a lower cradle assembly, an upper bed support assembly, and a suspension support assembly. The lower cradle assembly can be configured to mount and supporting the power source and a portion of the rear suspension and wheel assembly in any appropriate manner. The upper bed support can be configured to support a storage area of the vehicle 10. The suspension support assembly can be configured to support another portion of the rear suspension and wheel assembly.

III. Front and Rear Suspension and Wheel Assemblies

The vehicle 10 can include a front suspension and wheel assembly and a rear suspension and wheel assembly. As discussed above, the front suspension and wheel assembly can be connected to the front frame assembly 32. At least a portion of the rear suspension and wheel assembly can be mounted to the rear frame assembly 36.

Referring to FIG. 3, the suspension members 90L, 90R, 92L, 92R of the front suspension and wheel assembly can be configured as a double-wishbone suspension system (also referred to as upper and lower A-arms). Each of the suspension members 90L, 90R, 92L, 92R includes a pair of mounting points configured to be connected to a respective pair of the suspension brackets 100L, 100R, 102L, 102R. Each of the suspension members 90L, 90R, 92L, 92R can further include a single mounting point configured to be connected to a wheel hub or knuckle that can rotatably support a respective one of the front wheels 14L, 14R. However, exemplary embodiments are intend to include or otherwise cover suspension members that provide a different geometry and/or include multiple links, a strut, or other appropriate members in order to achieve the desired suspension performance so long as at least one of the suspension members on each side of the front frame assembly 32 is mounted to a suspension mounting bracket in accordance with the first upper mounting brackets 98L, 98R.

The rear suspension and wheel assembly can include the rear wheels 16L, 16R and at least one suspension member for each of the rear wheels 16L, 16R. The rear suspension and wheel assembly can include any appropriate suspension members, such as those described above for the front suspension and wheel assembly. Further, the rear suspension and wheel assembly can have the same type of suspension members as the front suspension and wheel assembly, or can have a different type of suspension members as compared to the front suspension and wheel assembly. For example, the rear suspension and wheel assembly can include a first rear suspension member, a second suspension member and a third suspension member connected on each side of the rear frame assembly 36. The first and second suspension members can be connected to each of the rear frame assembly 36 and a respective one of the rear wheels 16L, 16R. The third rear suspension member can be connected to a rear end portion of the main frame assembly 30 and connected to the respective one of the rear wheels 16L, 16R. In another exemplary embodiment, the rear suspension and wheel assembly can include the first, second and third suspension members described above, and can additionally include a fourth suspension member connected on each side of the rear frame assembly. However, exemplary embodiments are intended to include or otherwise cover a rear suspension and wheel assembly that includes at least one rear suspension member connected to the rear frame assembly 36.

IV. Steering Assembly

The vehicle 10 can include a steering assembly configured to transfer steering inputs from an operator in the passenger compartment of the main frame assembly 30 to the front wheels 14L, 14R. Referring to FIG. 3, the steering assembly can include a steering wheel, a steering column assembly 168, a steering rack assembly 86, and a pair of tie rods 170L, 170R. The steering column assembly 168 is shown in phantom in FIG. 3.

The steering rack assembly 86 can be mounted to and supported by the transverse frame assembly 82 of the front frame assembly 32. That is, the front frame assembly 32 can include the steering rack assembly 86. The tie rods 170L, 170R can be coupled to the steering rack assembly 86 and to a respective one of the front wheels 14L, 14R. The steering column assembly 168 can pass through an opening in the plate 122 so that one end can be connected to the steering rack assembly 86 and a second end can be located in the passenger compartment of the main frame assembly 30. The steering wheel can be connected to the second end of the steering column assembly 168.

Each of the ties rods 170L, 170R can be pivotally coupled to a respective end of a steering rack movable supported within a housing of the steering rack assembly 86 and to the respective one of the front wheels 14L, 14R such that linear displacement of the steering rack 174 results in pivoting of the front wheels 14L, 14R about a kingpin axis associated with the front wheels 14L, 14R.

V. Final Drive Assembly

The final drive assembly 88 can transfer torque output by the power source to each of the front wheels 14L, 14R. The final drive assembly 88 can contain any appropriate mechanism that can transmit torque input to the mechanism to each of the front wheels 14L, 14R. For example, the housing can contain an input structure and an output structure. The input structure can be configured to receive torque from a power source. The output structure can be configured to transfer at least a portion of the torque to at least one of the wheels 14L, 14R. The input structure can include an input gear driven by the power source. The output structure can be an output gear driven by the input gear. The output gear can drive one or each of a pair of driveshafts. Each of the driveshafts can drive a respective one of the front wheels 14L, 14R. In another example, a differential gear assembly can couple the output gear to each of the driveshafts such that each of the wheels 14L, 14R can be driven at different speeds and different percentages of the torque input by the power source. In yet another example, a plurality of friction members can be arranged such that torque input by the power source can be differentially distributed to each of the driveshafts.

The driveshafts can include one or more shaft segments and at least one of the shaft segments extends into a housing of the final drive assembly 88. That is, each of the driveshafts can be connected to the output structure contained within the final drive assembly 88. The driveshafts can be coupled to the output structure mounted inside of the final drive assembly 88 and to a respective one of the front wheels 14L, 14R in any appropriate manner such as but not limited to universal joints, constant-velocity joints, splines, combinations thereof, or via other known output coupling structures.

VI. Load and Kinetic Energy Management Apparatus

The features of the front frame assembly 32 as described can form a load and kinetic energy management apparatus. The load and kinetic energy management apparatus can distribute throughout the front frame assembly 32 a load or kinetic energy input to the front frame assembly 32 via one or both of the front wheels 14L, 14R as the vehicle 10 travels along an improved or unimproved path such that load concentrations in any one particular component or portion of the front frame assembly 32 can be reduced or prevented. Further, the load and kinetic energy management apparatus can absorb and distribute a load or kinetic energy input via the front bumper assembly 34 such that deformation of the front frame assembly 32 can occur in a predetermined and controlled manner.

The load and kinetic energy management apparatus can include the first upper suspension brackets 98L, 98R connected to the first front frame members 76L, 76R at a first location on the first front frame members 76L, 76R. This first location can be spaced above the front lower frame members 74L, 74R and below a location where the second front fame members 78L, 78R connect to the first front frame members 76L, 76R.

The load and kinetic energy management apparatus can include structure of the transverse frame assembly 82 connected to a respective one of the first upper suspension brackets 98L, 98R. Further, the load and kinetic energy management apparatus can include one more structures(s) of the front final drive assembly 88 that can be connected to one or more structures(s) of the transverse frame assembly 82 in any appropriate manner such as but not limited to threaded fasteners, rivets, welds, adhesives, or any combination thereof. The first upper suspension brackets 98L, 98R can cooperate with the structure(s) of the front final drive assembly 88 and the structure(s) of the transverse frame assembly 82 such that a load or kinetic energy input into one of the first upper suspension brackets 98L, 98R and/or the first lower suspension brackets 102L, 102R by the front suspension and wheel assembly can be distributed throughout both sides of the front frame assembly 32, and then distributed into the main frame assembly 30.

For example, a load or kinetic energy input by the left-side upper suspension member 90L can be transferred to the left-side first upper suspension bracket 98L. The first left-side first upper suspension bracket 98L can then distribute the load or kinetic energy to each of the transverse frame assembly 82 and the left-side first front frame member 76L. In turn, the left-side first front frame member 76L can transfer a portion of the load or kinetic energy input to the front lower frame member 74L. Further, the transverse frame assembly 82 can transfer a portion of the load or kinetic energy into the front final drive assembly 88. In turn, front final drive assembly 88 can transfer a portion of the load or kinetic energy input to a different structure(s) of the transverse frame assembly 82 on the right side of the vehicle 10. From there, the right-side structure(s) of the transverse frame assembly 82 can transfer a portion of the load or kinetic energy input to the right-side first front frame member 76R. Subsequently, the right-side first front frame member 76R can transmit a portion of the load or kinetic energy input into the right-side front lower frame member 74R.

A similar example can occur with respect to the right-side upper suspension member 90R. Thus, the load and kinetic energy management apparatus can distribute a load or kinetic energy input by the front suspension and wheel assembly to both sides of the front frame assembly 32 such that each of the front lower frame members 74L, 74R can distribute a respective portion of the load or kinetic energy input by each of the upper suspension members 90L, 90R throughout the front frame assembly 32 and then into the main frame assembly 30.

A similar load or energy distribution can involve the first lower suspension brackets 102L, 102R, the first front frame members 76L, 76R, the front final drive assembly 88 and the front lower frame members 74L, 74R.

The load and kinetic energy management apparatus can include the front bumper assembly 34 and the transverse frame assembly 82. The front bumper assembly 34 can be connected to a common length of the first frame members 76L, 76R that includes connections with the first upper suspension brackets 98L, 98R and the transverse frame assembly 82 such that the common length of the first front frame members 76L, 76R can defines a common node through which the load and energy management apparatus can transmit a load or kinetic energy input in each of the transverse direction T of the vehicle 10 and the longitudinal direction L of the vehicle 10 to the front lower frame members 74L, 74R and the main frame 30.

Figure 7:
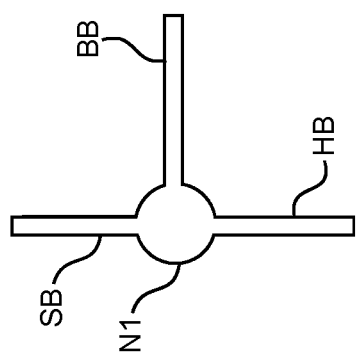
FIG. 7 is a schematic view of a first node formed by portions of the frame assembly of the vehicle of FIG. 1.

FIG. 7 is a schematic representation of an exemplary first node N1 that can be formed in a region of a frame member (such as but not limited to one of the first front frame members 74L, 74R) by a suspension bracket SB (such as but not limited to one of the upper suspension brackets 98L, 98R), a bumper bracket BB (such as but not limited to one of the upper bumper brackets 106L, 106R), and a structure HB of the transverse frame assembly 82 (such as but not limited to brackets mounted to bottom of the plate 122) that is connected to the front final drive assembly 88.

Figure 8:
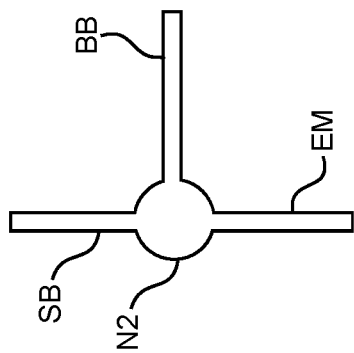
FIG. 8 is a schematic view of a second node formed by portions of the frame assembly of the vehicle of FIG. 1.

FIG. 8 is a schematic representation of an exemplary second node N2 that can be formed in a region of a frame member (such as but not limited to one of the first front frame members 74L, 74R) by a suspension bracket SB (such as but not limited to one of the upper suspension brackets 98L, 98R), a bumper bracket BB (such as but not limited to one of the lower bumper brackets 108L, 108R), and a structure EM of the front final drive assembly 82 (such as but not limited to structures extending from the housing of the front final drive assembly 88).

The load and energy management apparatus can further include the first front frame members 76L, 76R. Referring to FIGS. 2-6, each of the first front frame members 76L, 76R can be connected to a respective one of the lower frame members 74L, 74R and a connected to respective one of the first cage side members 62 (also referred to as pillar members).

Referring to FIGS. 4-6, each of the first front frame members 76L, 76R can include a first portion 360L, 360R, a second portion 362L, 362R, a first bend 364L, 364R, an inward bend 366L, 366R, a first end 368L, 368R and a second end 370L, 370R. (The first ends 368L, 368R are obstructed from view by the brackets 98L, 98R, 106L, 106R). The inward bend 366L 366R can include a second bend 372L, 372R and a third bend 374L, 374R. (The right-side second bend 372R is obstructed from view by the upper bracket 110 in FIG. 4).

Referring to FIG. 6, the vehicle 10 can have a longitudinal axis LA that extends in the longitudinal direction L of the vehicle 10 and bisects the vehicle 10 in the transverse direction T of the vehicle 10. The first end 368L, 368R of the first front frame members 76L, 76R can be closer to the longitudinal axis LA than is the second end 370L, 370R of the first front frame members 76L, 76R as measured along the transverse direction T of the vehicle 10. That is, the first ends 368L, 368R of the first front frame members 76L, 76R can be spaced apart from each other by a first distance measured in the transverse direction T of the vehicle 10, and the second ends 370L, 370R of the first front frame members 76L, 76R can be spaced apart from each other by a second distance measured in the transverse direction T of the vehicle such that the second distance is greater than the first distance.

The first end 368L, 368R of each of the first front frame members 76L, 76R can be spaced away from the first front cross frame member 118 such that the first front cross frame member 118 can be located between the first end 368L, 368R and the first bend 364L, 364R of each of the first front frame members 76L, 76R.

Each of the first portions 360L, 360R can extend upwardly from a respective one of the lower frame members 74L, 74R along the vertical direction V of the vehicle 10 from the first end 368L, 368R of the first front frame members 76L, 76R to the second bend 372L, 372R of the inward bend 366L, 366R.

Each of the first portions 360L, 360R can include the first bend 364L, 364R. The first bend 364L, 364R can be located between the inward bend 366L, 366R and the first end 368L, 368R of the first frame member 76L, 76R.

Each of the first portions 360L, 360R can include a first sloped portion 376L, 376R and a second sloped portion 378L, 378R. Each of the first sloped portions 376L, 376R can extend from the first end 368L, 368R to the first bend 364L, 264R. Each of the second sloped portions 378L, 378R can extend from the first bend 364L, 364R to the second bend 372L, 372R of the inward bend 366L, 366R. The first sloped portions 376L, 376R can be inclined relative to the longitudinal direction L and vertical direction V of the vehicle 10 at a first slope. The second slope can be inclined relative to the longitudinal direction L and vertical direction V of the vehicle 10 at a second slope that is less than the first slope. That is, the first sloped portion 376L, 376R can extend in a direction that is closer to the vertical direction V of the vehicle 10 than is the second sloped portion 378L, 378R. Each of the second front frame members 78L, 78R can be connected to and extend from a respective one of the second sloped portions 378L, 378R.

Each of the second portions 362L, 362R can extend from the inward bend to the second end 370L, 370R. Each of the second portions 362L, 362R can extend from the inward bend 366L, 366R rearwardly along the longitudinal direction L of the vehicle 10 and outwardly along a transverse direction T of the vehicle 10 toward the first cage side member 62. Each of the second portions 362L, 362R can extend downwardly toward the lower frame members 74L, 74R along the vertical direction V of the vehicle 10.

The second bends 372L, 372R and the third bends 374L, 374R can be spaced apart from each other along the second portions 362L, 362R. The location on the second portion 362L, 362R, the shape, and the arc length of each of the inward bends 366L, 366R can be selected such that the inward bends 366L, 366R can deform in a predetermined and controlled manner if a load or kinetic energy is applied to the front bumper assembly 34 along the longitudinal direction L of the vehicle 10. For example, each of the second portions 362L, 362R can bend at either one or both of the bends 372L, 372R, 374L, 374R if the load or kinetic energy applied to the front bumper assembly 34 exceeds a third predetermined threshold. This predetermined threshold can be the same as or different from the first predetermined threshold for the front bumper assembly 34 and/or the plate 122. Further, a predetermined threshold at which the second bends 372L, 372R can deform can be the same as or different from a threshold at which the third bends 374L, 374R can deform. Accordingly, each of the first front frame members 76L, 76R can be configured to deform by bending at the inward bend 366L, 366R if a load or kinetic energy that exceeds a predetermined threshold is applied to first front frame member 76L, 76R along the longitudinal direction L of the vehicle 10.

Although the exemplary embodiment of FIGS. 1-6 shows each of the first front frame members 76L, 76R as a unitary piece that extends continuously from the first end 368L, 368R to the second end 370L, 370R, the disclosed subject matter is intended to include or otherwise cover any appropriate segmentation of the first front frame members 76L, 76R. For example, each of the first front frame members 76L, 76R can be segmented such that any combination of the portions 360L, 360R, 362L, 362R and bends 364L, 364R, 372L, 372R, 374L, 374R can be separately formed and subsequently connected together in any appropriate manner that can achieve the desired stiffness for absorbing loads and kinetic energy input by the front suspension and wheel assembly, while also providing the desired deformation in a controlled and predetermined manner.

In the exemplary embodiments described above, when following the load and energy distribution paths described above, the load and energy management apparatus can transmit a load or kinetic energy input to one of the first front frame members 76L, 76R to each of the front lower frame members 74L, 74R via the front final drive assembly 88 and a different one of the first frame members 74L, 74R. Further, the load and energy management apparatus can transmit a load or kinetic energy input by the front bumper assembly 34 to the plate 122 such that the plate 122 can resist the load or kinetic energy input via the front bumper assembly 34 until the front bumper assembly 34 initially collapses in the longitudinal direction L of the vehicle 10. Further, the plate 122 can collapse in the direction toward the main frame assembly 30 if the load or energy continues to be inputted to the first front frame members 76L, 76R via the front bumper assembly 34 after the front bumper assembly 34 initially collapses. Further still, the second portions 362L, 362R of the first front frame members 76L, 76R can deform (e.g., by bending) at the second bend 372L, 372R of the inward bend 366L, 366R and/or the third bend 374L, 374R of the inward bend 366L, 366R if the load or kinetic energy continues to be inputted to the first front frame members 76L, 76R via the front bumper assembly 34 after the front bumper assembly 34 initially collapses. The predetermined thresholds for each of the front bumper assembly 34, the plate 122 and the inward bends 366L, 366R of second portion 362L, 362R of the first front frame members 76L, 76R can be the same predetermined threshold or a different predetermined threshold can be set for one or all of these structures. Accordingly, the frame assembly 18 of the vehicle 10 can provide rigidity sufficient to absorb and distribute a load or kinetic energy input by the front suspension and wheel assembly without undesirable deformation of the front frame assembly 32. Further, the frame assembly 18 of the vehicle 10 can provide an ability to absorb and distribute a load or kinetic energy input by the front bumper assembly 34 that can permit deformation of the front frame assembly 32 in a predetermined and controlled manner.

VII. Alternative Embodiments

While certain embodiments of the disclosed subject matter are described above, and FIGS. 1-8 disclose a best mode for practicing the various inventive aspects, it should be understood that the invention can be embodied and configured in many different ways without departing from the spirit and scope of the invention.

For example, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

The disclosed subject matter is intended to include or otherwise cover any type of front frame assembly 32. In other words, exemplary embodiments are intended to cover any application of front frame assembly that can sustain load or kinetic energy inputs from a front suspension and wheel assembly while also being capable of responding in a predetermined and controlled manner to a load or kinetic energy input in the longitudinal direction of the vehicle 10. For example, one or both of the first and second frame members can be made from a plurality of parts or made as a unitary homogenous component.

Exemplary embodiments are intended to include any appropriate shape for each of the first and second frame members. Further, exemplary embodiments are intended to include the first frame members and the second frame members divided differently as compared to the first and second frame members described above. For example, a first frame member can terminate at a junction with the second frame member, and the second frame member can include a second end that is connected to the main frame assembly.

The first frame member or the second frame can be connected to any appropriate portion of the main frame assembly.

The disclosed subject matter can also include any type of front suspension and wheel assembly. For example, embodiments are disclosed in the context of an upper suspension member and a lower suspension member that are configured as A-arms (also referred to as wishbones). Exemplary embodiments are intended to include an upper suspension member that has a unique geometry compared to the lower suspension member. The upper suspension member can also have the same or different geometry compared to the lower suspension member. Further, the front suspension and wheel assembly can include one or more suspension members configured differently than the upper suspension member and the lower suspension member, and used in place of the upper suspension member and/or the lower suspension members.

Embodiments are disclosed above in the context of vehicle 10 shown in FIG. 1 having a front frame assembly that includes a front bumper assembly. However, the disclosed subject matter can include or otherwise cover a vehicle that has a rear frame assembly, a rear bumper assembly and a rear suspension and wheel assembly configured in a manner as described above with respect to the front frame assembly, the front bumper assembly and the front suspension and wheel assembly.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A frame assembly of a vehicle comprising:
   a longitudinal frame member extending in a longitudinal direction of the vehicle;
   a transverse frame member extending in a transverse direction of the vehicle and connected to the longitudinal frame member;
   a lower frame member connected to the transverse frame member and extending in the longitudinal direction of the vehicle forward of the longitudinal frame member;
   a pillar member connected to the longitudinal frame member and extending upwardly and away from the lower frame member, the pillar member extending upwardly along a vertical direction of the vehicle; and
   a first frame member including a first end connected to the lower frame member and a second end connected to the pillar member, and the first frame member including an inward bend located between the first end and the second end such that the first frame member extends upwardly from the lower frame member along the vertical direction of the vehicle from the first end of the first frame member to the inward bend and the first frame member extends from the inward bend rearwardly along the longitudinal direction of the vehicle and outwardly along a transverse direction of the vehicle toward the pillar member.

2. The frame assembly of a vehicle according to claim 1, wherein first frame member is configured to deform by bending at the inward bend if a load or kinetic energy that exceeds a predetermined threshold is applied to first frame member along the longitudinal direction of the vehicle.

3. The frame assembly of a vehicle according to claim 1, wherein the lower frame member extends from the first end of the first frame member and toward the pillar member along the longitudinal direction of the vehicle.

4. The frame assembly of a vehicle according to claim 1, wherein the first frame member includes:
   a first portion extending from the first end to the inward bend, the first portion extending upwardly away from the lower frame member along the vertical direction of the vehicle, and the first portion extending rearwardly toward the pillar member along the longitudinal direction of the vehicle; and a second portion extending from the inward bend to the second end, the second portion extending downwardly toward the lower frame member along the vertical direction of the vehicle, the second portion extending rearwardly toward the pillar member along the longitudinal direction of the vehicle, and the second portion extending outwardly toward the pillar member along the transverse direction of the vehicle.

5. The frame assembly of a vehicle according to claim 1, wherein
the first frame member includes a first bend located between the inward bend and the first end of the first frame member, and
the inward bend includes a second bend and a third bend spaced apart from each other along the second portion.

6. The frame assembly of a vehicle according to claim 1, wherein the first frame member includes:
a first bend located between the inward bend and the first end of the first frame member;
a first sloped portion that extends from the first end to the first bend, the first sloped portion is inclined relative to the longitudinal and vertical directions of the vehicle at a first slope; and
a second sloped portion that extends from the first bend to the inward bend, the second sloped portion is inclined relative to the longitudinal and vertical directions of the vehicle at a second slope that is less than the first slope.

7. The frame assembly of a vehicle according to claim 6, further comprising a second frame member connected to and extending from each of the lower frame member and the second sloped portion of the first frame member.

8. The frame assembly of a vehicle according to claim 1, wherein the first frame member is a unitary piece that extends continuously from the first end of the first frame member to the second end of the first frame member.

9. The frame assembly of a vehicle according to claim 1, wherein the vehicle has a longitudinal axis, and the first end of the first frame member is closer to the longitudinal axis than is the second end of the first frame member as measured along the transverse direction of the vehicle.

10. The frame assembly of a vehicle according to claim 1, further comprising a second frame member including a first end connected to the lower frame member and a second end connected to the first frame member.

11. The frame assembly of a vehicle according to claim 1, wherein the pillar member is located at a front corner of a passenger compartment of the vehicle, and the lower frame member is positioned forward of the pillar member.

12. A frame assembly of a vehicle comprising:
a pair of lower frame members extending in a longitudinal direction of the vehicle, the lower frame members being spaced apart from each other in a transverse direction of the vehicle;
a pair of pillar members being spaced apart from each other in the transverse direction of the vehicle, each of the pillar members extending upwardly away from a respective one of the lower frame members, the pillar members extending upwardly along a vertical direction of the vehicle; and
a pair of first frame members being spaced apart in the transverse direction of the vehicle, each of the first frame members including a first end connected to a respective one of the lower frame members and a second end connected to a respective one of the pillar members, and each of the first frame member including an inward bend located between first end and the second end such that each of the first frame members extends upwardly from the respective one of the lower frame members along the vertical direction of the vehicle from the first end of the first frame member to the inward bend and each of the first frame members extends from the inward bend rearwardly along the longitudinal direction of the vehicle and outwardly along a transverse direction of the vehicle toward the respective one of the pillar members.

13. The frame assembly of a vehicle according to claim 12, wherein
the first ends of the first frame members are spaced apart from each other by a first distance measured in the transverse direction of the vehicle,
the second ends of the first frame members are spaced apart from each other by a second distance measured in the transverse direction of the vehicle, and
the second distance is greater than the first distance.

14. An all-terrain vehicle comprising:
a main frame assembly defining a passenger compartment of a vehicle, and including,
a pair of A-pillar members located at respective front corners of the passenger compartment and extending along a vertical direction of the all-terrain vehicle, and
a cross member extending between the A-pillars along a transverse direction of the all-terrain vehicle;
a front frame assembly connected to a front portion of the main frame assembly, and including,
a pair of lower frame members extending in a longitudinal direction of the vehicle, the lower frame members being spaced apart from each other in a transverse direction of the vehicle, and
a pair of first frame members being spaced apart in the transverse direction of the vehicle, each of the first frame members including a first end connected to a respective one of the lower frame members and a second end connected to a respective one of the pillar members, and each of the first frame members including an inward bend located between the first end and the second end such that each of the first frame members extends upwardly from the respective one of the lower frame members along the vertical direction of the vehicle from the first end of each of the first frame members to the inward bend and each of the first frame members extends from the inward bend rearwardly along the longitudinal direction of the vehicle and outwardly along a transverse direction of the vehicle toward the respective one of the pillar members.

15. The all-terrain vehicle according to claim 14, wherein the main frame assembly further includes a pair of longitudinal members that are spaced apart from each other in the transverse direction of the all-terrain vehicle, the longitudinal members extend along the longitudinal direction of the all-terrain vehicle,
the cross member extends from and is connected to each of the longitudinal members, and
each of the A-pillar members extend from and are connected to a respective one of the longitudinal members.

16. The all-terrain vehicle according to claim 14, further comprising a front bumper assembly connecting to the front frame assembly such that the front frame assembly is located between the front bumper assembly and the main frame assembly, and the front bumper assembly being configured to deform toward the main frame assembly if a load or kinetic energy that exceeds a first predetermined threshold is applied to the front bumper assembly along the longitudinal direction of the vehicle, wherein each of the first frame members are configured to deform by bending at the inward bend if the load or kinetic energy that is applied to the first frame member along the longitudinal direction of the vehicle exceeds a second predetermined threshold.

17. The all-terrain vehicle according to claim 16, wherein the second predetermined threshold is different from the first predetermined threshold.

18. The all-terrain vehicle according to claim 14, wherein
the main frame assembly further includes a first upper cross member that extends from and is connected to each of the A-pillar members,
the first upper cross member is spaced away from each of the lower frame members by a first distance measured in the vertical direction of the vehicle,
the second end of each of the first frame members is spaced away from each of the lower frame members by a second distance measured in the vertical direction of the vehicle, and
the second distance is greater than the first distance.

19. The all-terrain vehicle according to claim 14, wherein the main frame assembly further includes a pair of B-pillar members spaced apart from each other in the transverse direction of the all-terrain vehicle, the B-pillar members are spaced rearwardly from the A-pillar members along the longitudinal direction of the all-terrain vehicle, each of the B-pillar members is located at a respective rear corner of the passenger compartment, and each of the B-pillar members extends along a vertical direction of the all-terrain vehicle.

20. The all-terrain vehicle according to claim 14, further comprising a second frame member including a first end mounted on the lower frame member and a second end mounted on the first frame member, the second frame member inclining away from the pillar member such that the first end of the second frame member is closer to the pillar than is the second end of the second frame member.

* * * * *